United States Patent [19]

Kashima

[11] Patent Number: 5,038,730
[45] Date of Patent: Aug. 13, 1991

[54] START CONTROL SYSTEM FOR ALCOHOL ENGINE

[75] Inventor: Takamitsu Kashima, Tokyo, Japan

[73] Assignee: Fuji Jukogyo Kabushiki Kaisha, Tokyo, Japan

[21] Appl. No.: 561,321

[22] Filed: Aug. 1, 1990

[30] Foreign Application Priority Data

Aug. 9, 1989 [JP] Japan .................................. 1-208049
Aug. 9, 1989 [JP] Japan .................................. 1-208050

[51] Int. Cl.$^5$ ............................................. F02N 17/00
[52] U.S. Cl. .................................. 123/179 H; 123/1 A
[58] Field of Search ............... 123/1 A, 179 H, 180 E, 123/552, 494

[56] References Cited

U.S. PATENT DOCUMENTS

| | | | |
|---|---|---|---|
| 4,380,975 | 4/1983 | Powell | 123/179 H |
| 4,383,507 | 5/1983 | Powell | 123/179 H |
| 4,413,594 | 11/1983 | Hirota | 123/1 A |
| 4,426,762 | 1/1984 | Otani et al. | 123/179 H |
| 4,896,636 | 1/1990 | Pfefferle | 123/179 H |
| 4,945,863 | 8/1990 | Schmitz et al. | 123/1 A |

Primary Examiner—Andrew M. Dolinar
Assistant Examiner—M. Macy
Attorney, Agent, or Firm—Beveridge, DeGrandi & Weilacher

[57] ABSTRACT

A start control system for an alcohol engine having heater means for heating fuel injected by an injector, comprising: sensing means for sensing an alcohol concentration of the fuel; detecting means for detecting an engine temperature; judging means responsive to said alcohol concentration and said engine temperature for judging an engine start disable state; computing means responsive to said alcohol concentration and said engine temperature for computing a necessary calorific power of the heater sufficient for enhancement of vaporization of the fuel in said engine start disabled state; and controlling means responsive to said necessary calorific power for controlling a time for turning on the heater.

15 Claims, 17 Drawing Sheets

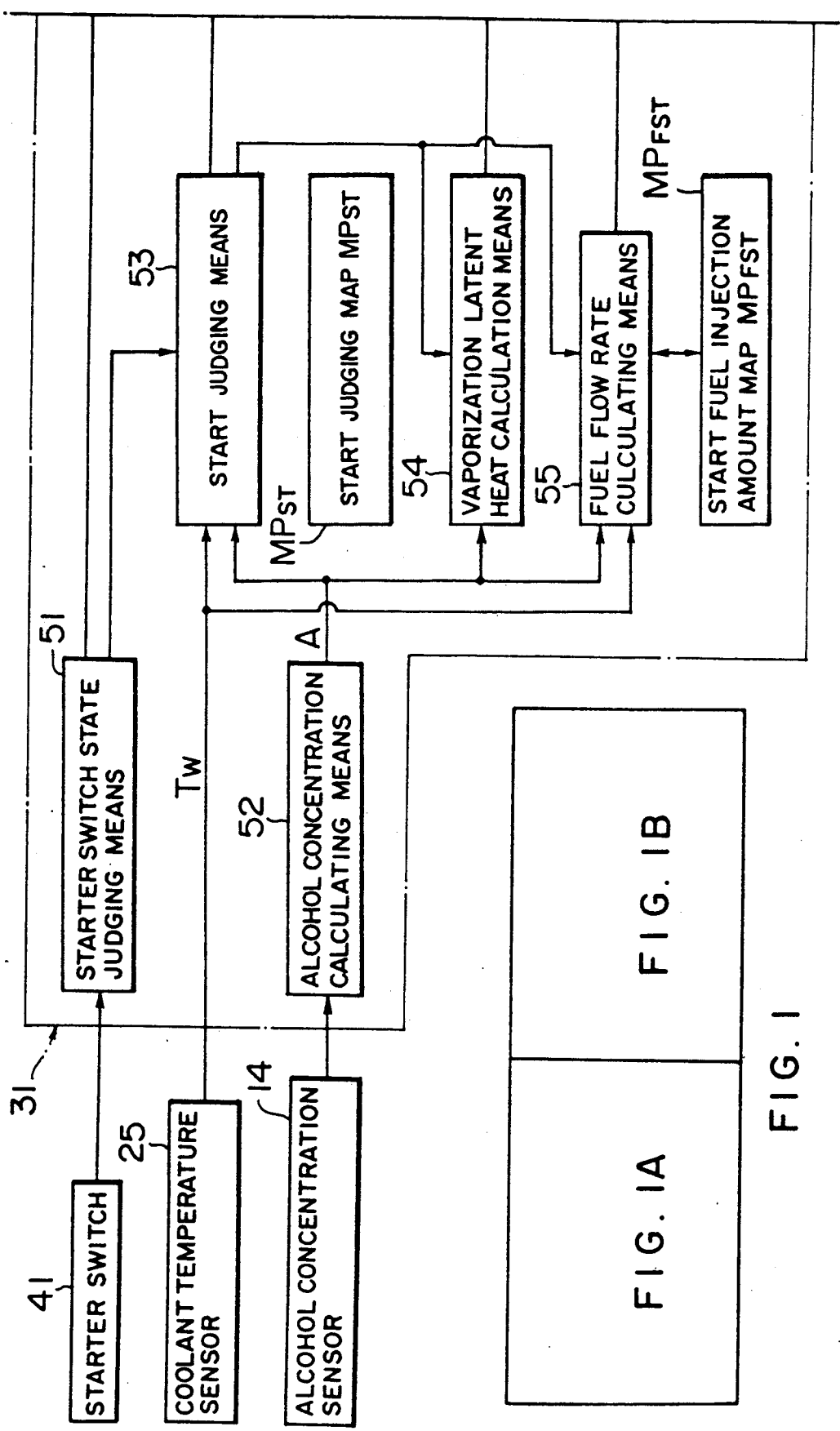
FIG. IA
FIG. I

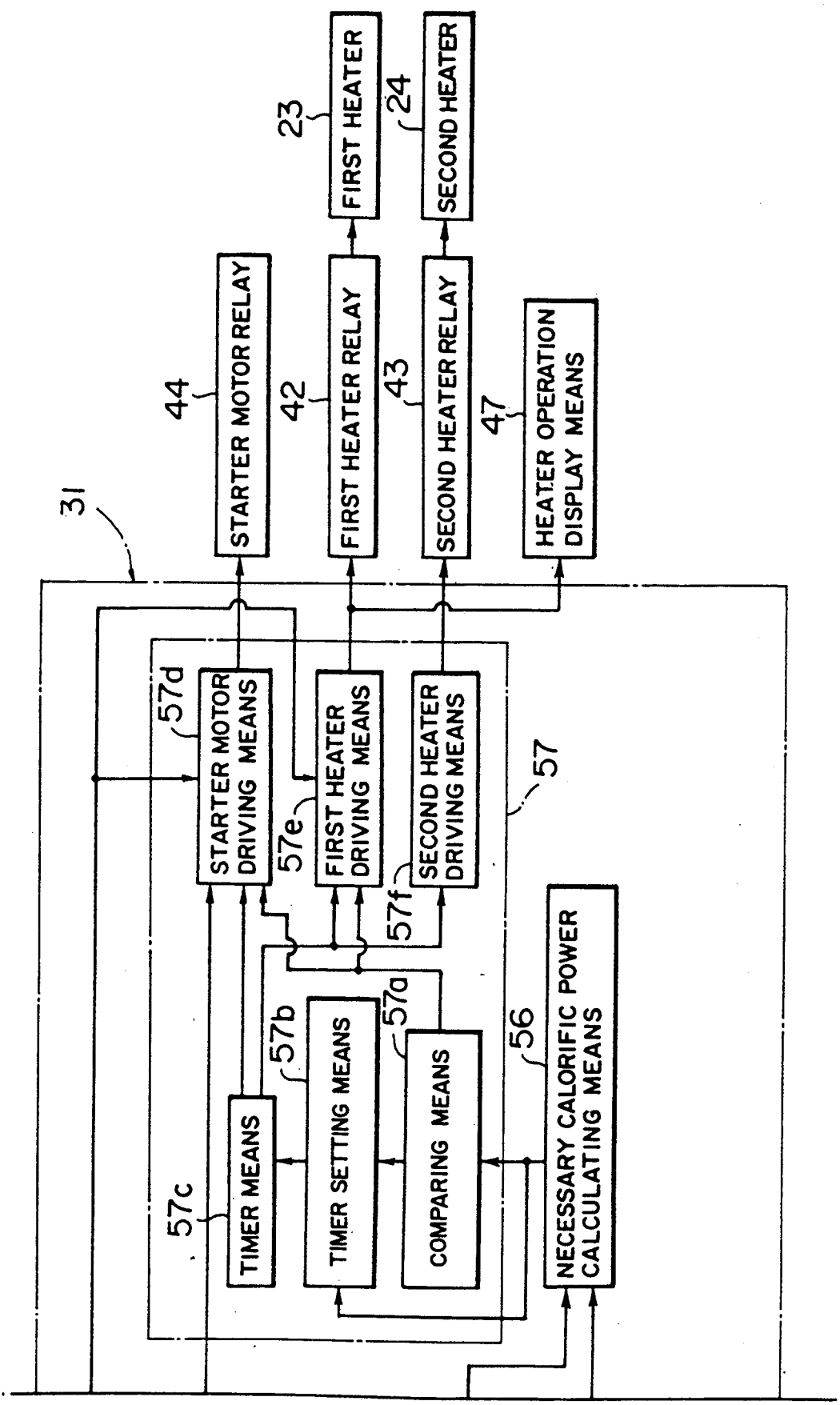
FIG. IB

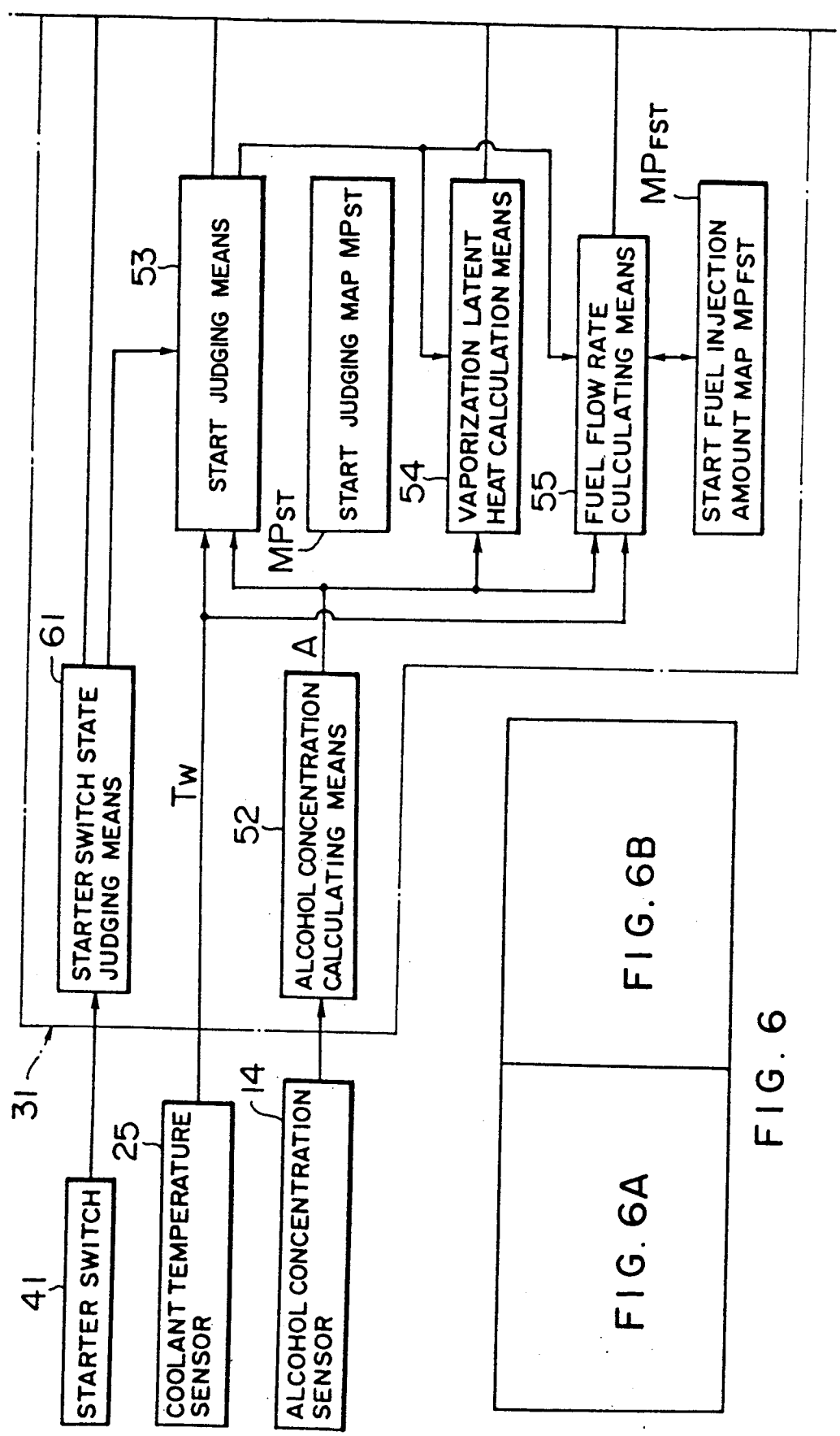

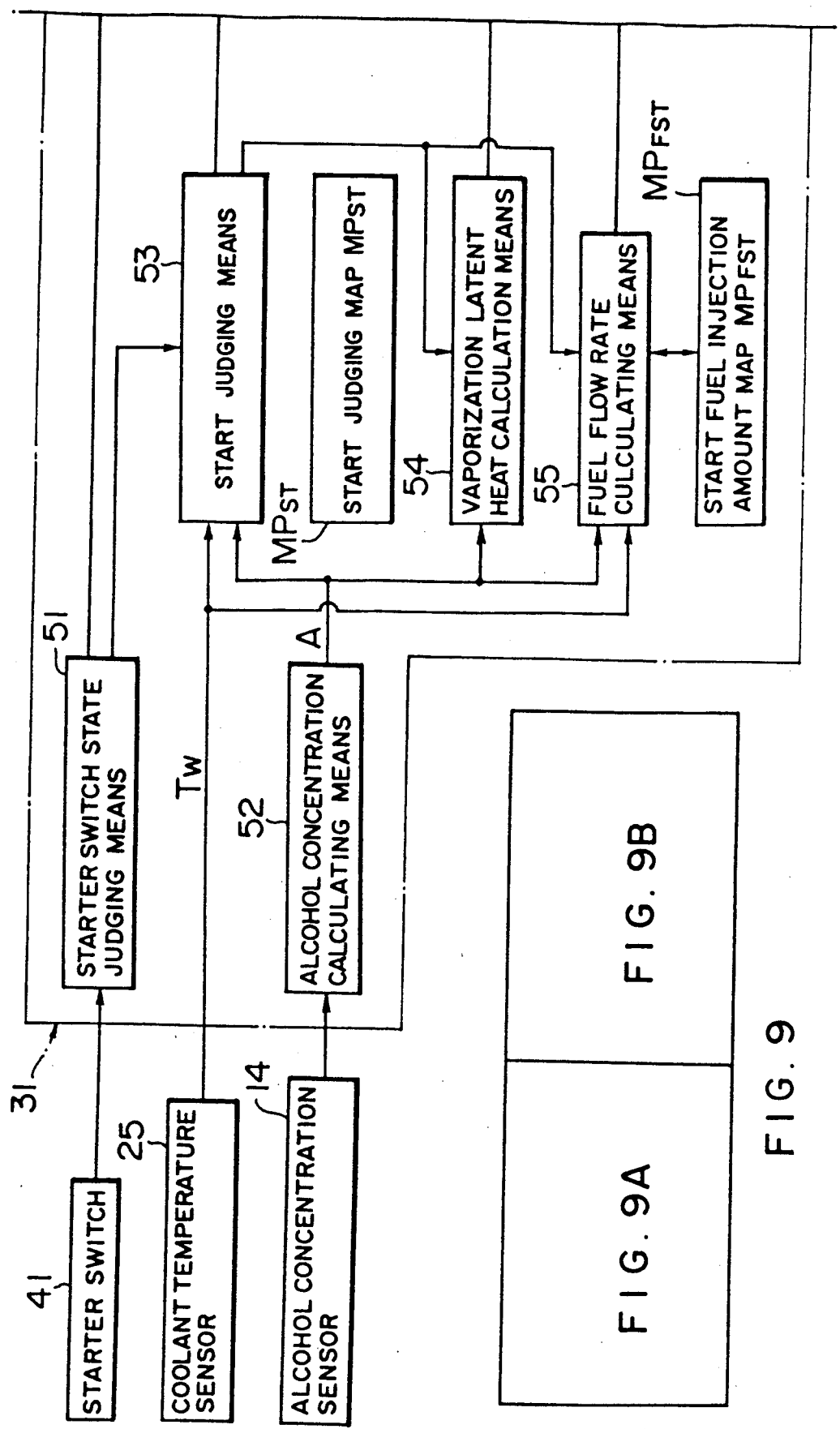

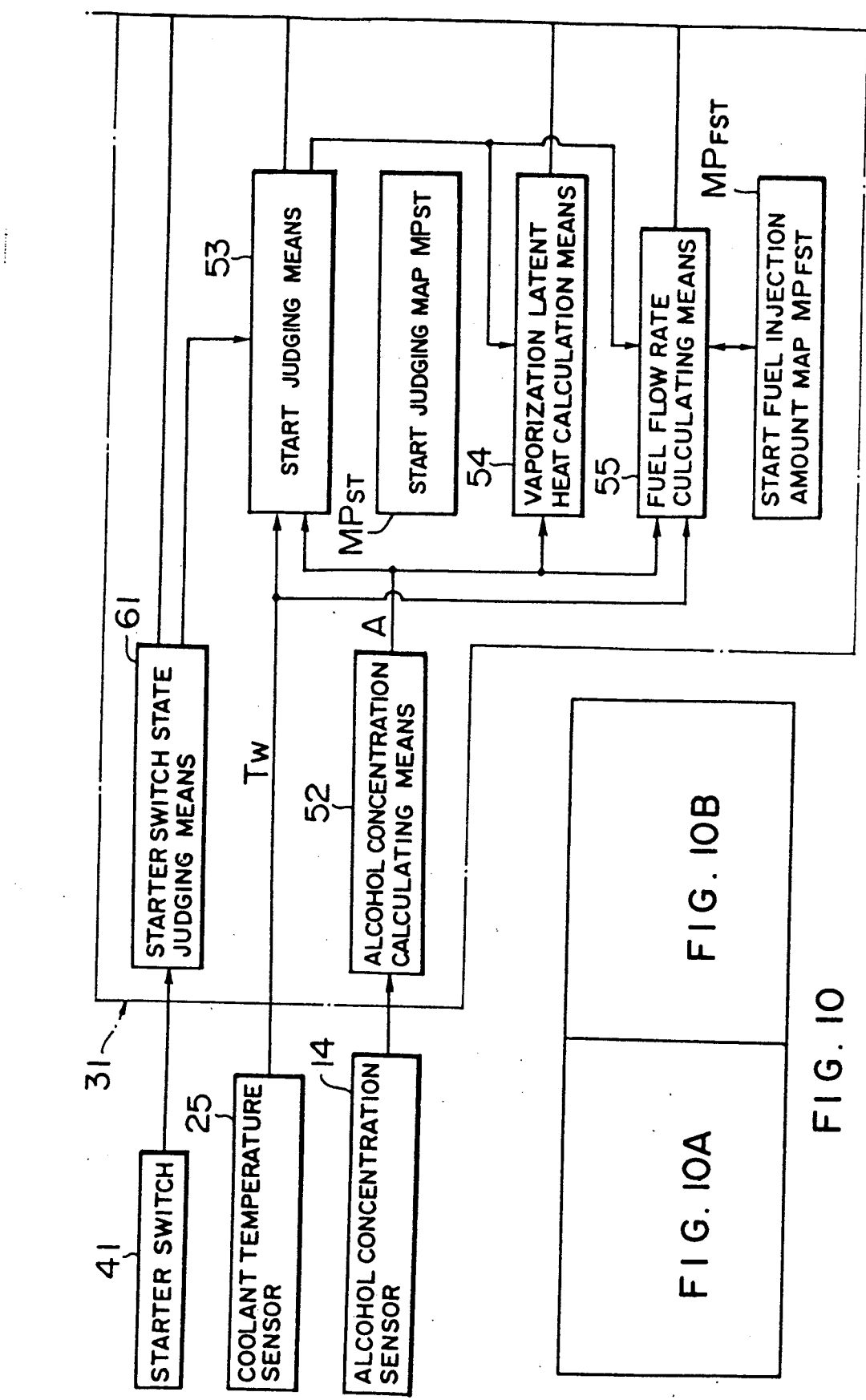

START CONTROL SYSTEM FOR ALCOHOL ENGINE

BACKGROUND OF THE INVENTION

The present invention relates to a start control system for an alcohol engine capable of readily starting the engine by enhancing vaporization of a fuel to be supplied to the engine.

Because of possible shortage of fuel and the demand for purifying exhaust gas, the system using both gasoline and alcohol as the fuel has been practically used. A vehicle using this system (hereinafter called a Flexible Fuel Vehicle (FFV)) runs by using not only gasoline but also a mixed fuel of gasoline and alcohol, or only alcohol. The alcohol concentration (content) of a fuel used by FFV changes from 0% (only gasoline) to 100% (only alcohol) depending upon the circumstances of fuel supply.

An alcohol fuel has characteristics of a hard vaporization at a low temperature as compared with a gasoline fuel, a large latent heat of vaporization, a high flashing temperature, and the like. The engine output performance changes considerably with the alcohol concentration depending upon engine temperature at that time. Especially, there is a problem that the low temperature start performance is degraded at a high alcohol concentration.

There is known a technique dealing with the above problems, wherein the start performance can be improved by enhancing the vaporization of a fuel by using heating means such as a heater. For instance, there is disclosed in Japanese Patent Laid-open Publication No. 57-52665 the technique according to which a heater for heating an air intake pipe is controlled in accordance with an output from an alcohol concentration sensor in such a way that the calorific power of the heater is increased when the alcohol concentration becomes equal to or larger than a preset value.

The calorific power of the heater required for starting an engine changes largely with the engine temperature. Accordingly, if the calorific power of the heater is determined merely by the alcohol concentration, there is a possibility of failing to start an engine at a low temperature.

Further, if the calorific power is made large at a low engine temperature, electric power may be consumed wastefully when the atmospheric temperature rises or when the alcohol concentration lowers.

SUMMARY OF THE INVENTION

It is an object of the present invention to provide a start control system for an alcohol engine capable of setting a proper necessary calorific power of heating means in accordance with alcohol concentration and engine temperature, and improving the start performance of the engine without wasting electric power.

It is another object of the present invention to provide a start control system for an alcohol engine capable of setting a proper necessary calorific power of the heating means in accordance with the alcohol concentration and the engine temperature, performing an optimum control while considering the consumption of the necessary calorific power, and improving the start performance of the engine without increasing the battery capacity.

In order to achieve the abovementioned objects, there is provided a start control system for an alcohol engine having heater means for heating fuel injected by an injector, comprising: sensing means for sensing an alcohol concentration of the fuel; detecting means for detecting an engine temperature; judging means responsive to said alcohol concentration and said engine temperature for judging an engine start disable state; computing means responsive to said alcohol concentration and said engine temperature for computing a necessary calorific power of the heater sufficient for enhancement of vaporization of the fuel in said engine start disabled state; and controlling means responsive to said necessary calorific power for controlling a time for turning on the heater.

Specifically, the start judging means judges if the engine can be started or not, in accordance with the alcohol concentration of the fuel and the engine temperature. If it is judged that the engine cannot be started, the necessary calorific power calculating means calculates the necessary calorific power of the heating means sufficient for the enhancement of vaporization of the fuel and allowing the engine to start, in accordance with said alcohol concentration and said engine temperature.

The controlling means compares said necessary calorific power with a predetermined reference value, and if said necessary calorific power is larger than said reference value, a time to turn on said heating means is set in accordance with said necessary calorific power, and during this time heating means is powered.

In order to achieve the above-described second object of this invention, the controlling means compares said necessary calorific power calculated by said necessary calorific power is larger than said reference value, said heating means is powered for a predetermined time period and thereafter a starter motor is driven.

BRIEF DESCRIPTION OF THE DRAWINGS

FIGS. 1 to 5 show the first embodiment according to the first aspect of this invention, wherein:

FIGS. 1, 1A and 1B are functional block diagrams of a control unit;

FIG. 2 is a schematic diagram of an engine control system;

FIG. 3 illustrates a starting enable state judging map;

FIG. 4 illustrates a starting fuel injection amount map; and

FIGS. 6 to 8 shows the second embodiment according to the first aspect of this invention, wherein:

FIGS. 6, 6A and 6B are functional block diagrams of a control unit;

FIG. 7 is a schematic diagram of an engine control system; and

FIGS. 9, 9A and 9B are functional block diagrams of a control unit of the first embodiment according to the second aspect of this invention; and FIGS. 10, 10A and 10B are functional block diagrams of a control unit of the second embodiment according to the second aspect of this invention.

DETAILED DESCRIPTION OF THE PREFERRED EMBODIMENTS

Structure of Engine Control System

Figure 2:
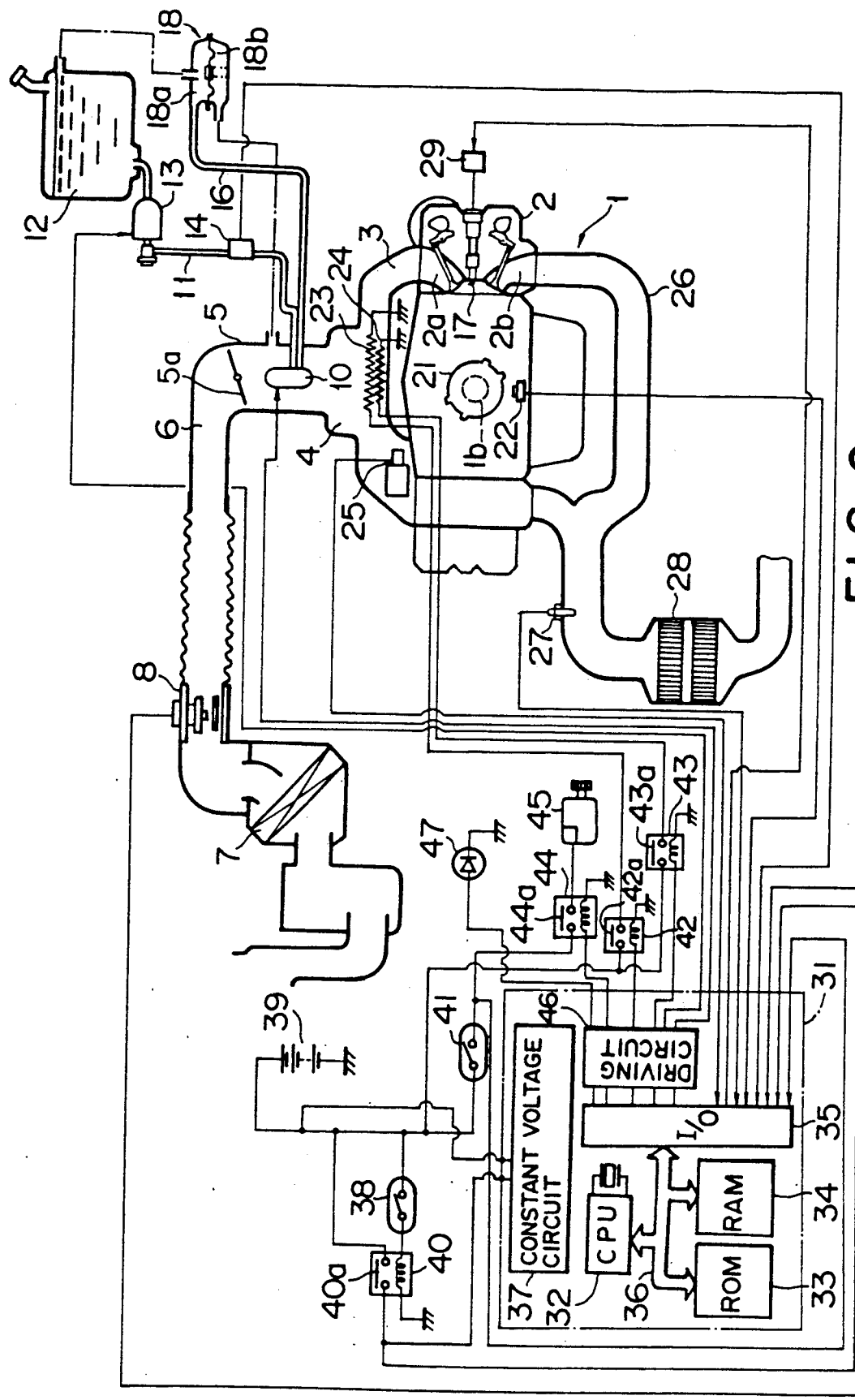

Referring to FIG. 2, reference numeral 1 generally represents an FFV alcohol engine of a horizontally opposing four cylinder type. An intake manifold 3 communicates with an air intake port 2a formed in a cylinder head 2 of the engine 1. A throttle chamber 5 communicates with the intake manifold 3 via an air chamber 4. An air cleaner 7 is mounted at an air intake pipe 6 at the upstream of the throttle chamber 5.

An intake air flow sensor (in FIG. 2 a hot wire type air flow meter) 8 is mounted at the downstream near the air cleaner 7 in the air intake pipe 6. An injector 10 is mounted at the downstream of the throttle valve 5a in the throttle chamber 5. This injector 10 is in communication with a fuel tank 12 via a fuel supply passage 11.

In this fuel tank 12, there is stored a fuel whose alcohol concentration A (%) differs depending upon the circumstance when user supplies the fuel. The fuel may be only alcohol, a mixed fuel of gasoline and alcohol, or only gasoline.

There are mounted at the fuel supply passage 11 a fuel pump 13 and an alcohol concentration sensor 14 in this order as viewed from the fuel tank 12. The injector 10 communicates with a fuel chamber 18a of a pressure regulator 18 via a return passage 16.

The fuel chamber 18a of the pressure regulator 18 communicates at its downstream with the fuel tank 12, and a pressure regulating chamber 18b communicates at the downstream near the throttle valve 5a. The pressure regulator 18 makes constant the pressure difference between the fuel pressure in the fuel supply passage 11 and the pressure at the downstream near the throttle valve 5a so that the fuel injection amount from the injector 10 is controlled so as not to change.

An ignition plug 17 is mounted at each cylinder of the cylinder head 2, the ignition plug 17 extending its tip within a combustion chamber. A crank rotor 21 is coupled to a crank shaft 1b of the engine 1. A crank angle sensor 22 is mounted opposing the outer periphery of the crank rotor 21, the sensor being constructed of an electromagnetic pickup for detecting the crank angle.

Under the air chamber 4 of the intake manifold 3, there is mounted heating means including first and second heaters 23 and 24. A coolant temperature sensor 25 is mounted facing a coolant passage (not shown) serving as a riser formed in the intake manifold 3.

At an exhaust pipe 26 communicating with an exhaust port 2b of the cylinder head 2, there is mounted an $O_2$ sensor 27. Reference numeral 28 represents a catalytic converter.

Arrangement of Control Unit

Reference numeral 31 generally represents a control unit. In this control unit 31, interconnected together via a bus line 36 are a CPU (Central Processing Unit) 32, a ROM 33, a RAM 34 and an I/O interface 35. The control unit 31 is supplied with a predetermined stable and constant voltage from a constant voltage circuit 37.

The constant voltage circuit 37 is connected to a relay contact 40a of an ignition relay 40 which is connected to a battery 39 via an ignition switch 38, so that the constant voltage circuit 37 supplies a control power to the control unit 31 when the ignition switch 38 connected in series to the battery 39 is turned on and supplies a backup power when the ignition switch 38 is turned off.

The battery 39 is connected to a starter switch 41, a relay contact 42a of a first heater relay 42, and a relay contact 43a of a second heater relay 43. The starter switch 41 is connected to a starter motor 45 via a relay contact 44a of a starter motor relay 44.

The above-described sensors 8, 14, 22, 25, 27, the relay contact 40a of the ignition relay 40, switches such as the starter switch 41, and the like are connected to input ports of the I/O interface 35.

To output ports of the I/O interface 35, there are connected the ignition plug 17 via an igniter 29, the injector 10 and the fuel pump 13 via the driver circuit 46, the first and second heater relays 42 and 43, the starter motor relay 44, and a LED 47 serving as display means of the heater operation.

The ROM 33 stores therein fixed data such as control programs, a start judging map MPST and a start fuel injection amount map MPFST. The RAM 34 stores therein processed output signals from various sensors and switches, and data processed by the CPU 32.

In accordance with the control programs stored in the ROM 33, the CPU 32 performs an engine start control by using engine state parameters detected by various sensors and switches and the alcohol concentration of a fuel detected by the alcohol concentration sensor 14. In this engine start control, the control unit 31 controls the electric power supplied to the first and second heaters 23 and 24 to thereby enhance the vaporization of the fuel injected from the injector 10 and readily start the engine.

After the engine starts, the control changes to the normal control whereby calculated are the fuel injection amount, ignition timing and the like, and outputted are a driving pulse width signal for the injector and an ignition signal for the ignition plug 17.

Function and Structure of Control Apparatus

As shown in FIG. 1, the start control function of the control unit 31 is constructed of starter switch state judging means 51, alcohol concentration calculating means 52, start judging means 53, start judging map MPST, vaporization latent heat calculating means 54, fuel flow rate calculating means 55, start fuel injection amount map MPFST, necessary calorific power calculating means 56, and start controlling means 57.

The start controlling means 57 is constructed of comparing means 57a, operation time setting means 57b, timer means 57c, starter motor driving means 57d, first heater driving means 57e, and second heater driving means 57f.

The starter switch state judging means 51 judges if the starter switch 41 is turned on or off. If the starter switch 41 is turned on, a trigger signal is outputted to the start judging means 53. If the starter switch 41 is turned off, the start controlling means 57 makes the starter motor relay 44 turn off, and the first heater driving means 57e makes the first heater relay 42 turn off and hence the first relay 23 turn off.

The alcohol concentration calculating means 52 reads a signal outputted from the alcohol concentration sensor 14 and calculates the alcohol concentration A of the fuel supplied to the injector 10.

Upon receiving of the trigger signal from the starter switch state judging means 51, the start judging means 53 judges if the engine can be started in accordance with the start judging map MPST by using as a parameter the alcohol concentration A calculated by the alcohol concentration calculating means 52 and the engine temperature derived from the coolant temperature Tw detected by the coolant temperature sensor 25.

If it is judged that the engine 1 can be started, the starter motor driving means 57d makes the starter motor relay 44 turn on and hence the starter motor 45 turn on. If it is judged that the engine cannot be started, a calculation start signal is output to the vaporization latent heat calculating means 54 and the fuel flow rate calculating means 55.

Figure 3:
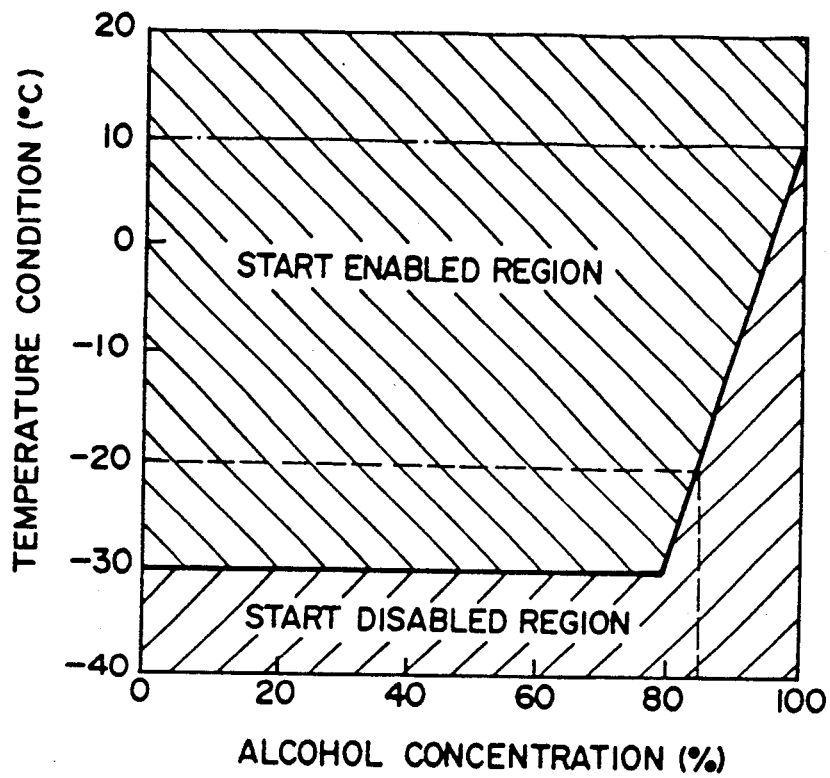

As shown in FIG. 3, in the start judging map MPST, the region of the alcohol concentration A at which the fuel injected by the injector can be used for starting the engine without heating it, and the region of the alcohol concentration A at which the fuel cannot be used for starting the engine, are specified beforehand through experiment or the like, with respect to the engine temperature typically represented by the coolant temperature Tw, and stored in the ROM 33 at predetermined addresses.

Instead of using the coolant temperature Tw from the coolant temperature sensor 25, oil temperature, fuel temperature or the like may be used.

Upon receiving of the calculation start signal from the start judging means 53, the vaporization latent heat calculating means 54 calculates the vaporization latent heat (carburetion heat) QS in accordance with the alcohol concentration A. This vaporization latent heat QSA is determined in accordance with the alcohol concentration A so that it can be determined by using a function f(A) of the alcohol concentration A (QS=f(A)).

Receiving the calculation start signal from the start judging means 53, the fuel flow rate calculating means 54 searches start fuel injection amount Ti from the start fuel injection amount map MPST by using as a parameter the coolant temperature Tw and the alcohol concentration A. In accordance with this searched start fuel injection amount Ti, fuel flow rate FL per unit time of the fuel injected from the injector 10 is calculated.

Figure 4:
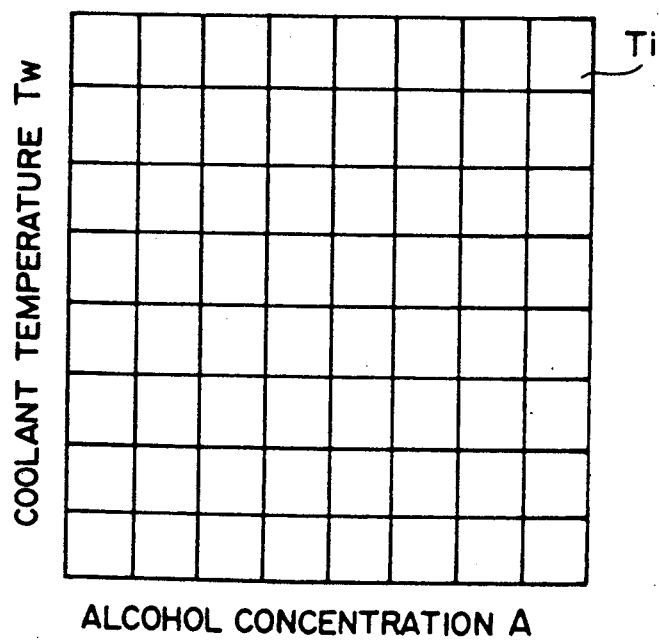

As shown in FIG. 4, the start fuel injection amount map MPFST stores a plurality of fixed fuel injection amounts to be injected from the injector at the engine start using as a parameter the alcohol concentration A and the coolant temperature Tw at predetermined addresses in the ROM 33. It is necessary to use a lower air/fuel ratio as the alcohol concentration A becomes higher so that a larger start fuel injection amount Ti is stored. On the other hand, it is necessary to increase the amount as the coolant temperature Tw lowers so that a larger start fuel injection amount Ti is stored.

In accordance with the fuel flow rate FL and the vaporization latent heat QS, the necessary calorific power calculating means 56 calculates calorific power necessary for the heating means including the first and second heaters 23 and 24 for the start of the engine (W = QS×FL).

The comparing means 57a compares the reference value WS with the necessary calorific power W calculated by the necessary calorific power calculating means 57. If w≦WS, the starter motor driving means 57d makes the starter motor relay 44 turn on, and the first heater driving means 57e makes the first heater relay 42 and the LED 47 turn on, to thereby turn on the starter motor 45 and the first heater 23 and present a heater operation display on the LED 47. If W>WS, a trigger signal is output from the operation time setting means 57b.

Upon receiving the trigger signal from the comparing means 57a, the operation time setting means 57b sets operation time for the timer means 57c, i.e., conduction time t while the first and second heaters 23 and 24 are turned on, by means of calculation or map searching in accordance with the necessary calorific power W.

The operation time is set longer as the necessary calorific power W becomes larger, and shorter as the necessary calorific power W becomes smaller. Namely, the necessary calorific power W (cal) is given by the Joule's law as:

$$W = 0.24 \times R \times I^2 \times t \qquad (1)$$
$$= 0.24 \times V^2 \times t/R$$

where R is a heater resistance, I is a current, t is a conduction time, and V is a voltage applied to the heater. Taking an efficiency as $\mu$, the equation (1) becomes:

$$W = 0.24 \times \mu \times V^2 \times t/R$$

The heater conduction time t can therefore be calculated by $$t = W \times R/(0.24 \times \mu \times V^2) \ldots \qquad (2)$$

Accordingly, assuming that the heater resistance R, heater voltage V and efficiency $\mu$ are constant, the heater conduction time (i.e., operation time) t can be calculated from a function f(W) of the necessary calorific power W, or can be searched from an optimum operation time map obtained through experiments, by using as a parameter the necessary calorific power W.

With the timer means 57c, during the operation time t set by the operation time setting means 57b, the first heater driving means 57e and the second heater driving means 57f make the first and second heater relays 42 and 43 turn on to power on the first and second heaters 23 and 24 and the LED 47 serving as heater operation display means. During this period, the starter motor relay 44 is maintained off so that the starter motor 45 is not driven.

Namely, through the comparison with the reference value WS, it is judged if the necessary calorific power W can be supplied sufficiently from the first heater 23 only or if the necessary calorific power W should be supplied from both the first and second heaters 23 and 24. If the necessary calorific power W is equal to or smaller than the reference value WS, only the first heater 23 is turned on. In this small power consumption case, the first heater 23 is turned on and the starter motor 45 is turned on to start the engine.

Alternatively, if the necessary calorific power W is larger than the reference value WS, both the first and second heaters 23 and 24 are turned on to supply the necessary calorific power W. In this large power consumption case, the operation time setting means 57b sets the optimum conduction time t for the first and second heater relays 42 and 43 so that the first and second heaters 23 and 24 are maintained turned on during this conduction time t to reduce the burden on the battery 39.

Operation

Next, the time sequential operation of the embodiment constructed as above will be described with reference to the flow chart shown in FIG. 5.

Figure 5A:
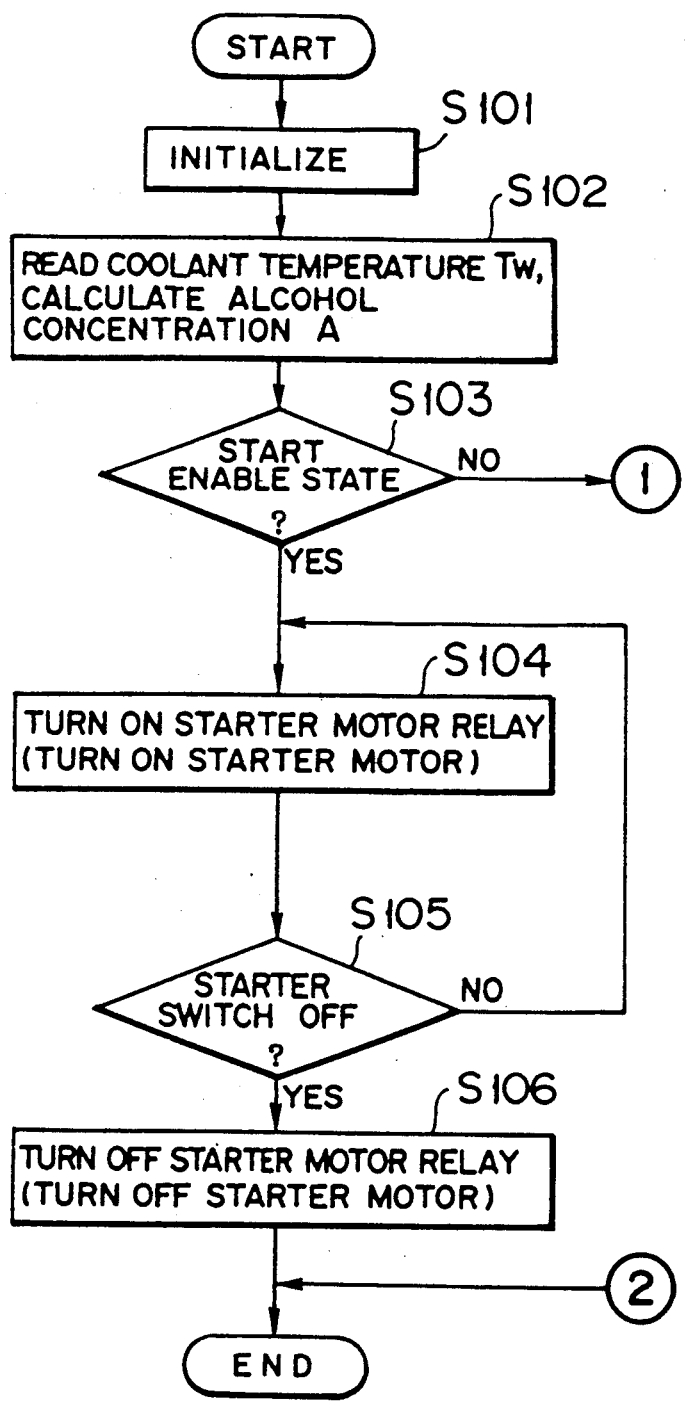
FIGS. 5A, 5B and 5C are flow charts showing the start control procedure.
Figure 5B:
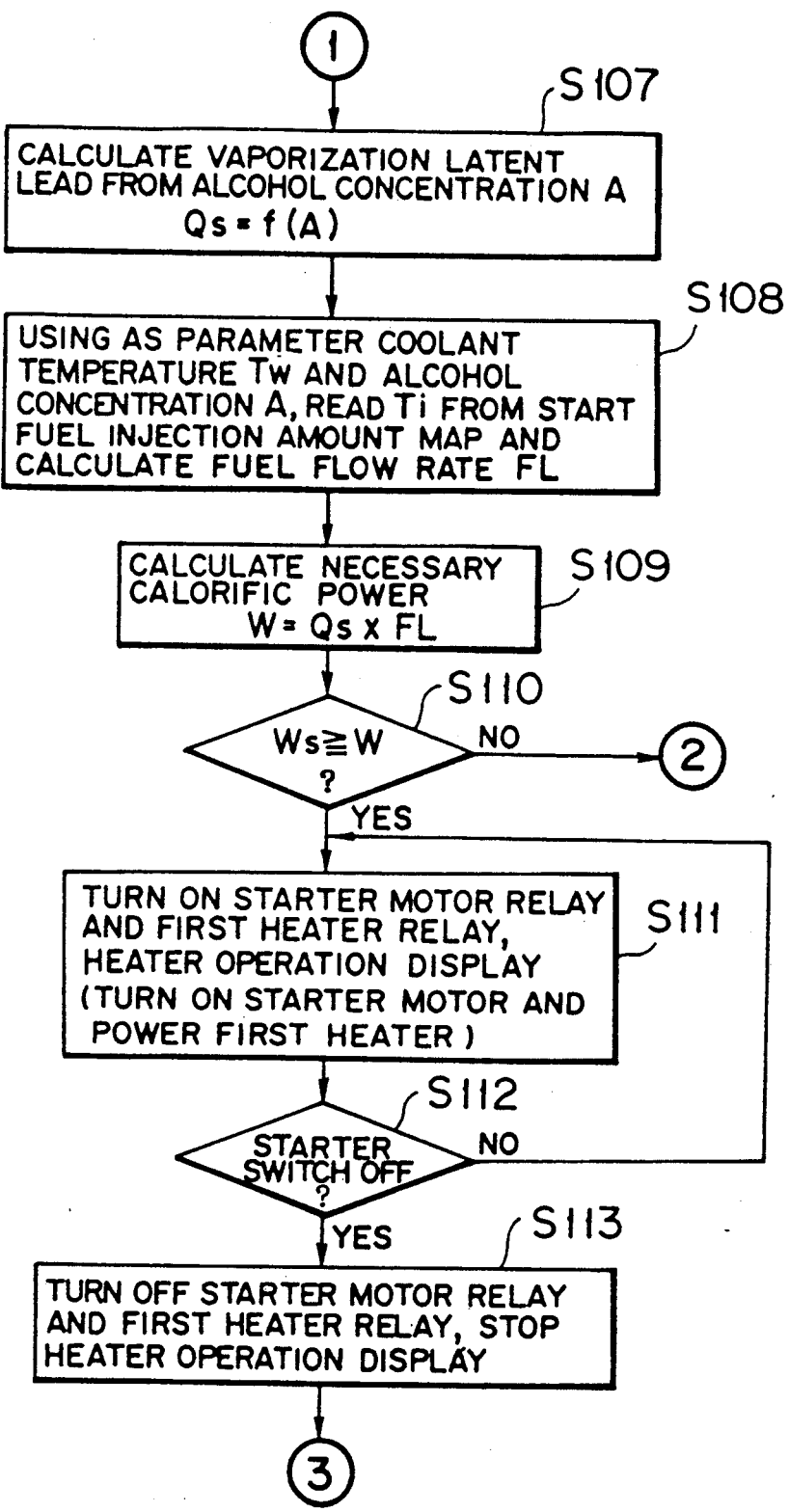
Figure 5C:
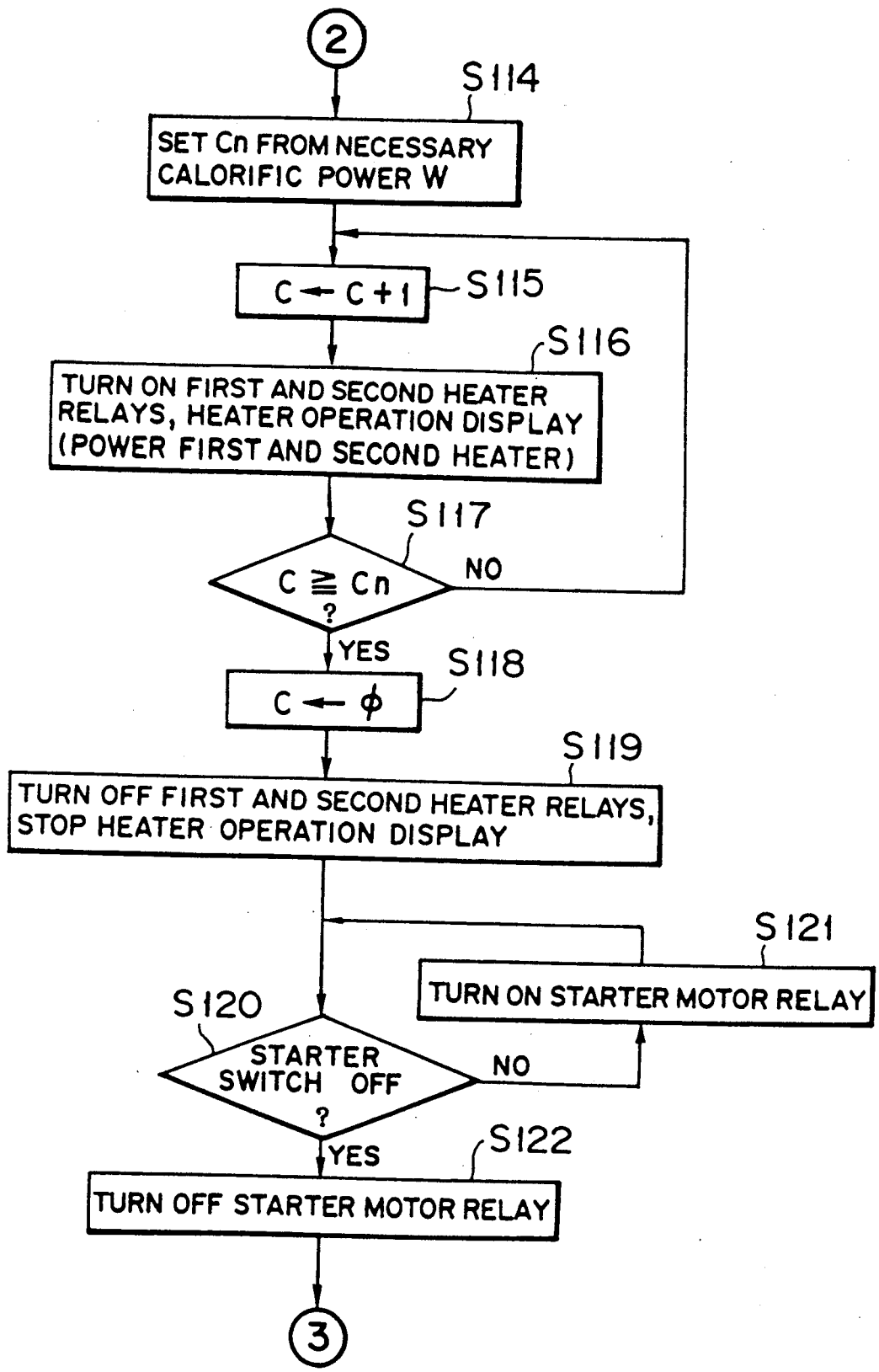

The program shown in the flow chart of FIG. 5 is an initial control program which starts running upon turning on the start switch 41. First, at a step S101, the initialization is carried out such as for counters and for the establishment of the initial conditions of relays 42, 43 and 44.

Specifically, the relays 42, 43, and 44 are made turned off. At a next step S102, the coolant temperature Tw is read from the coolant temperature sensor 25, and the alcohol concentration A is calculated from a signal output from the alcohol concentration sensor 14.

At a next step S103, by using as a parameter the coolant temperature Tw and calculated alcohol concentration A respectively obtained at the step S102, it is judged by using the start judging map MPST if the engine can be started.

If it is judged at the step S103 that the engine can be started, then the control advances to a step S104 whereat the starter motor driving means 57d makes the starter motor relay 44 turn on and hence the starter motor 45 turn on. At a step S105, it is checked if the starter switch 41 is made turned off.

If the starter switch 41 is not made turned off, the control returns from the step S105 to the step S104 to thereby continue to turn on the starter motor relay 44. If the starter switch 41 is made turned off, the control advances from the step S105 to a step S106 whereat the starter relay 44 is made turned on and the starter motor 45 is turned off to terminate the program.

If it is judged at the step S103 that the engine cannot be started, the control advances from the step S103 to a step S107 whereat the vaporization latent heat QS is calculated in accordance with the alcohol concentration A calculated at the step S102 (QS=f(A))), and thereafter the control advances to a step S108.

At the step S108, by using as a parameter the coolant temperature Tw and the alcohol concentration A, the start fuel injection amount Ti is searched from the start fuel injection amount map MPFST. The fuel flow rate FL per unit time is calculated from the start fuel injection amount Ti.

Next, at a step S109 the necessary heater calorific power W is calculated from the vaporization latent heat QS calculated at the step S107 and the fuel flow rate FL calculated at the step S108 (W=QS×FL).

At a step S110 the reference value WS is compared with the necessary heater calorific power W calculated at the step S109 to thereby judge if only the first heater 23 is to be powered or both the first and second heaters 23 and 24 are to be powered.

If WS≧W, the control advances from the step S110 to a step S111 whereat the starter motor relay 44 is turned on to drive the starter motor 45, and the first heater relay 42 is turned on to heat the fuel injected from the injector 10. At the same time, the LED 47 is powered to indicate that the heater is now powered.

Next, at a step S112 it is judged if the starter switch 41 is made turned off. If not, the control returns to the step S111 to maintain to turn on the starter motor relay 44, the first heater relay 42 and the LED 47. If the starter switch is made turned off, the control advances from the step S112 to a step S113.

At step S113, the starter motor relay 44, the first heater relay 42 and the starter motor 45 are turned off, and also the LED 47 is turned off to stop the heater operation display to thereafter terminate the program.

If it is judged at the step S110 as WS<W, the control advances from the step S110 to a step S114. At the step S114, the operation time Cn for a counter of the timer means 57c is determined and set to the counter in accordance with the necessary calorific power W calculated at the step S109.

Next, the counter starts counting. At a step S115, the count value C of the counter is incremented by 1. At a step S116, the first and second heater relays 42 and 43 are turned on and the LED 47 is powered to give a heater operation display.

Next, at a step S117, it is judged if the count C reaches the operation time Cn. If C<Cn, the control returns to the step S115 to continue counting. If C≧Cn, i.e., if the count C reaches the operation time Cn, the control advances to a step S118.

At the step S118, the count C of the counter is clarified. The control advances from the step S118 to a step S119. At the step S119, the first and second heater relays 42 and 43 are turned off, and also the LED 47 is turned off to stop the heater operation display.

It is judged at a step S120 if the starter switch 41 is made turned off. If not, at a step S121 the starter motor relay 4 is turned on to drive the starter motor 45 until the starter switch 41 is judged at the step S120 to be made turned off.

If it is judged at the step S120 that the starter switch 41 is turned off, the starter motor relay 44 is turned off at a step S122 to terminate the program.

2nd Embodiment

Figure 6B:
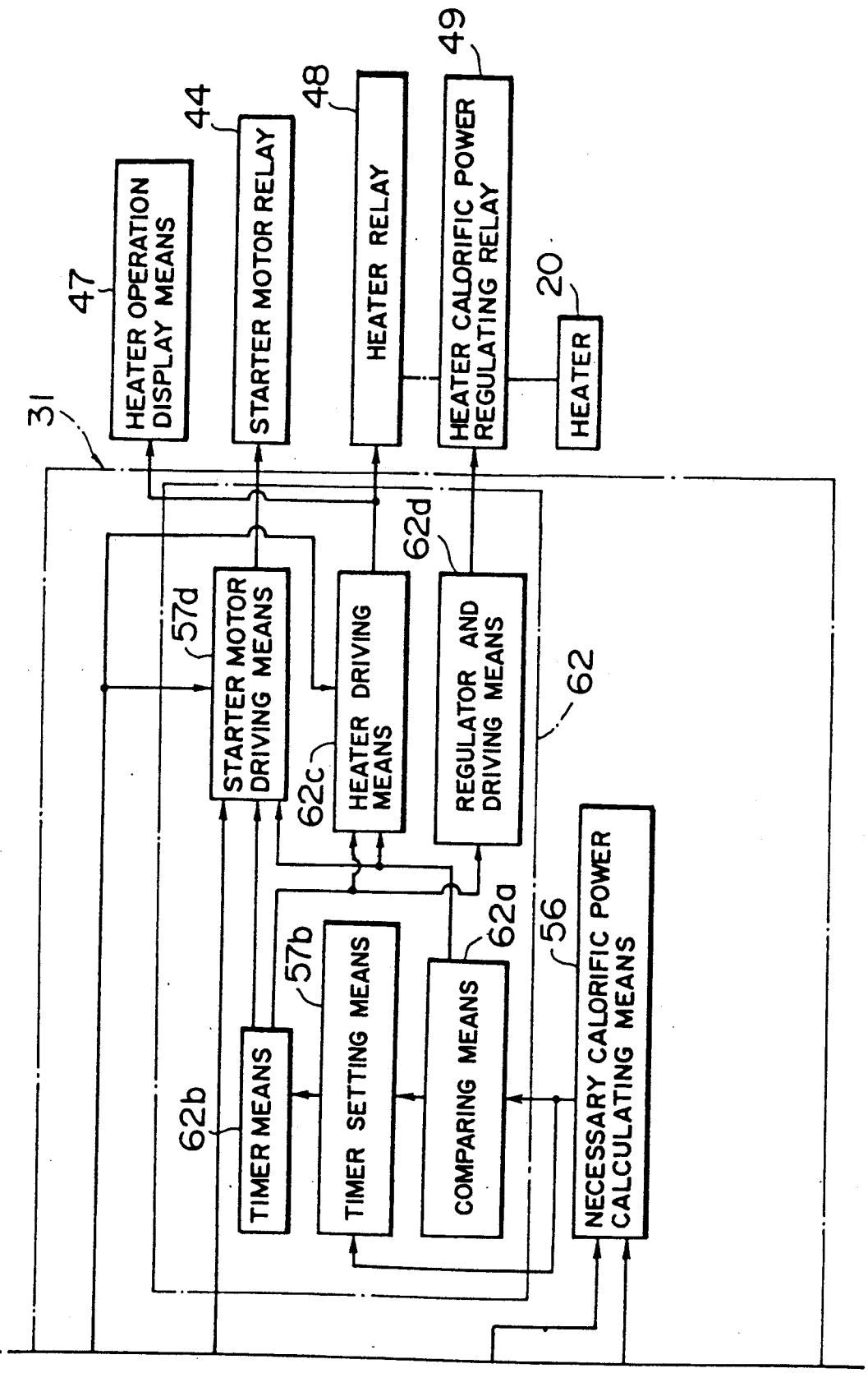
Figure 7:
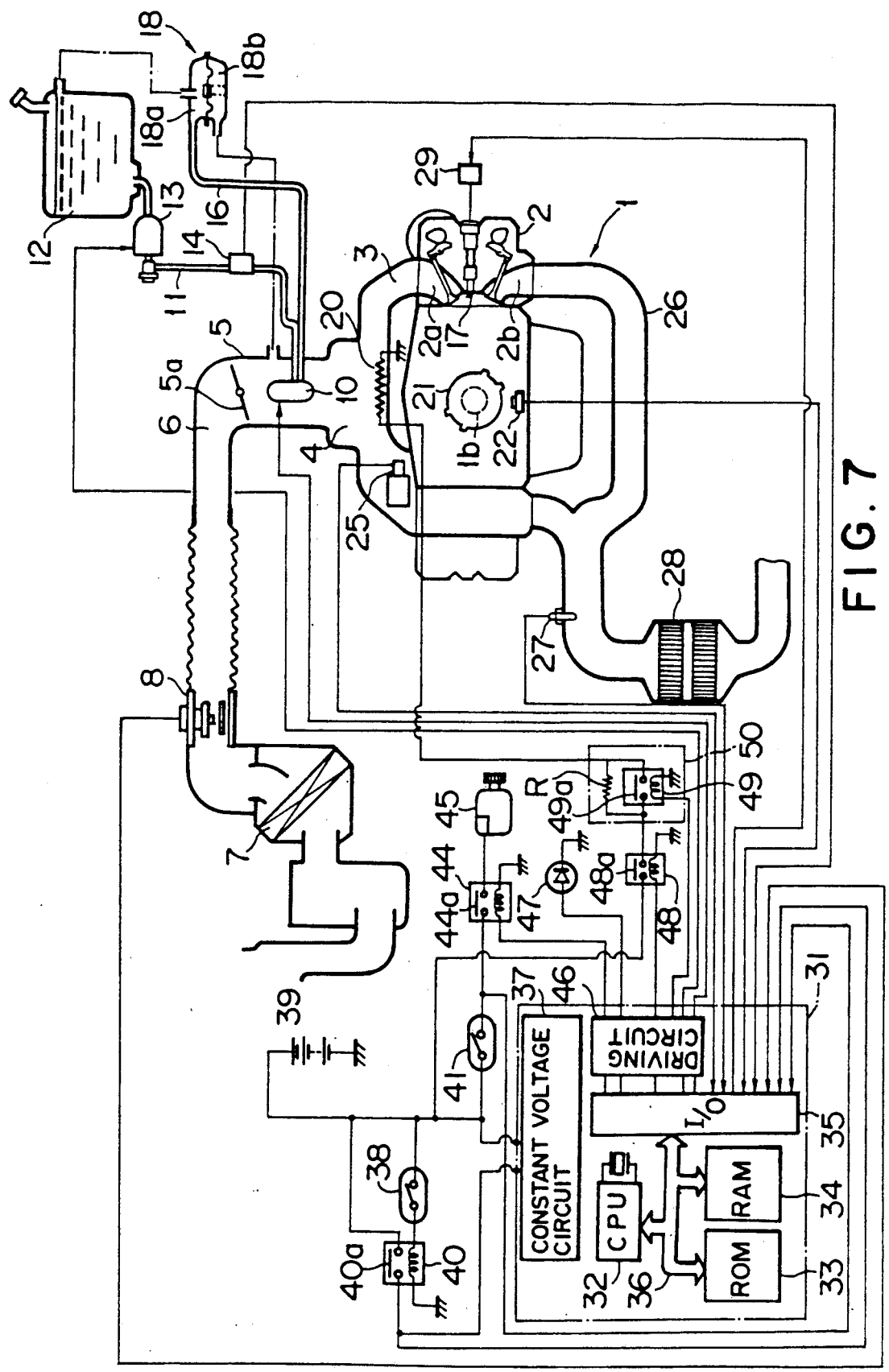
Figure 8A:
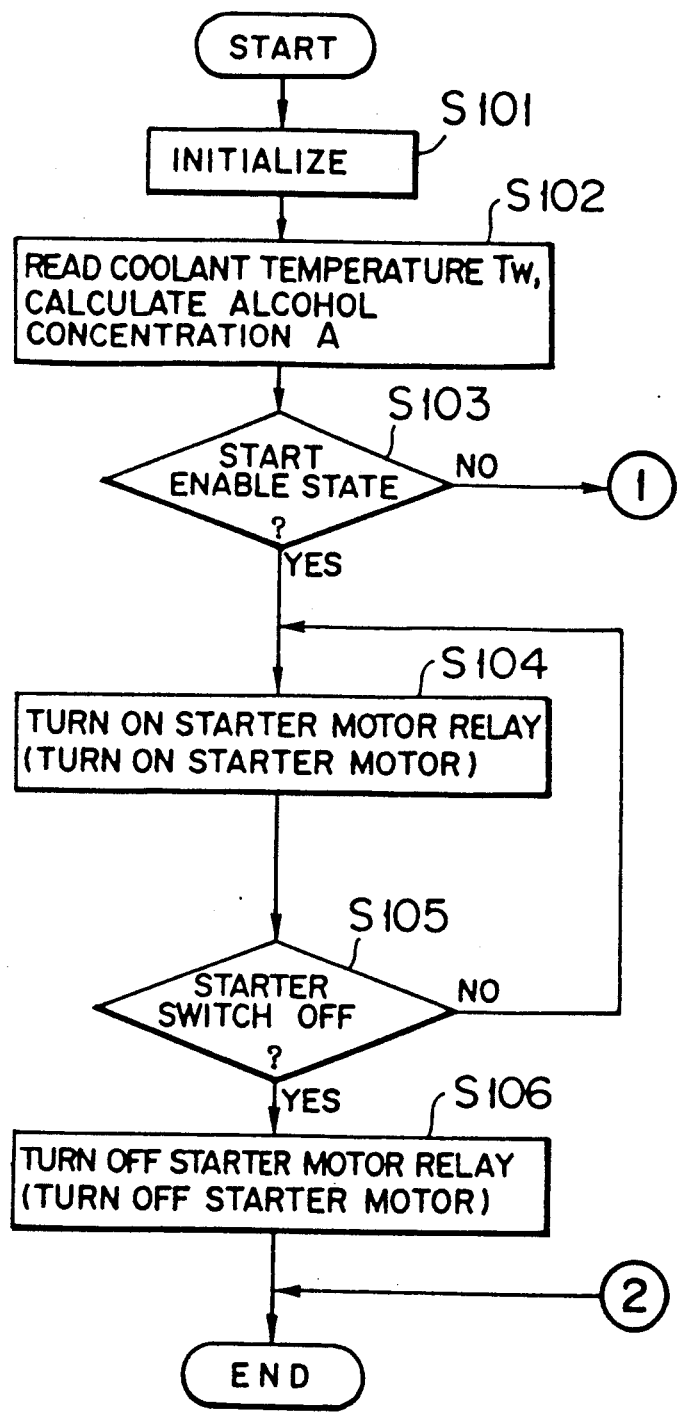
FIGS. 8A, 8B and 8C are flow charts showing the start control procedure.
Figure 8B:
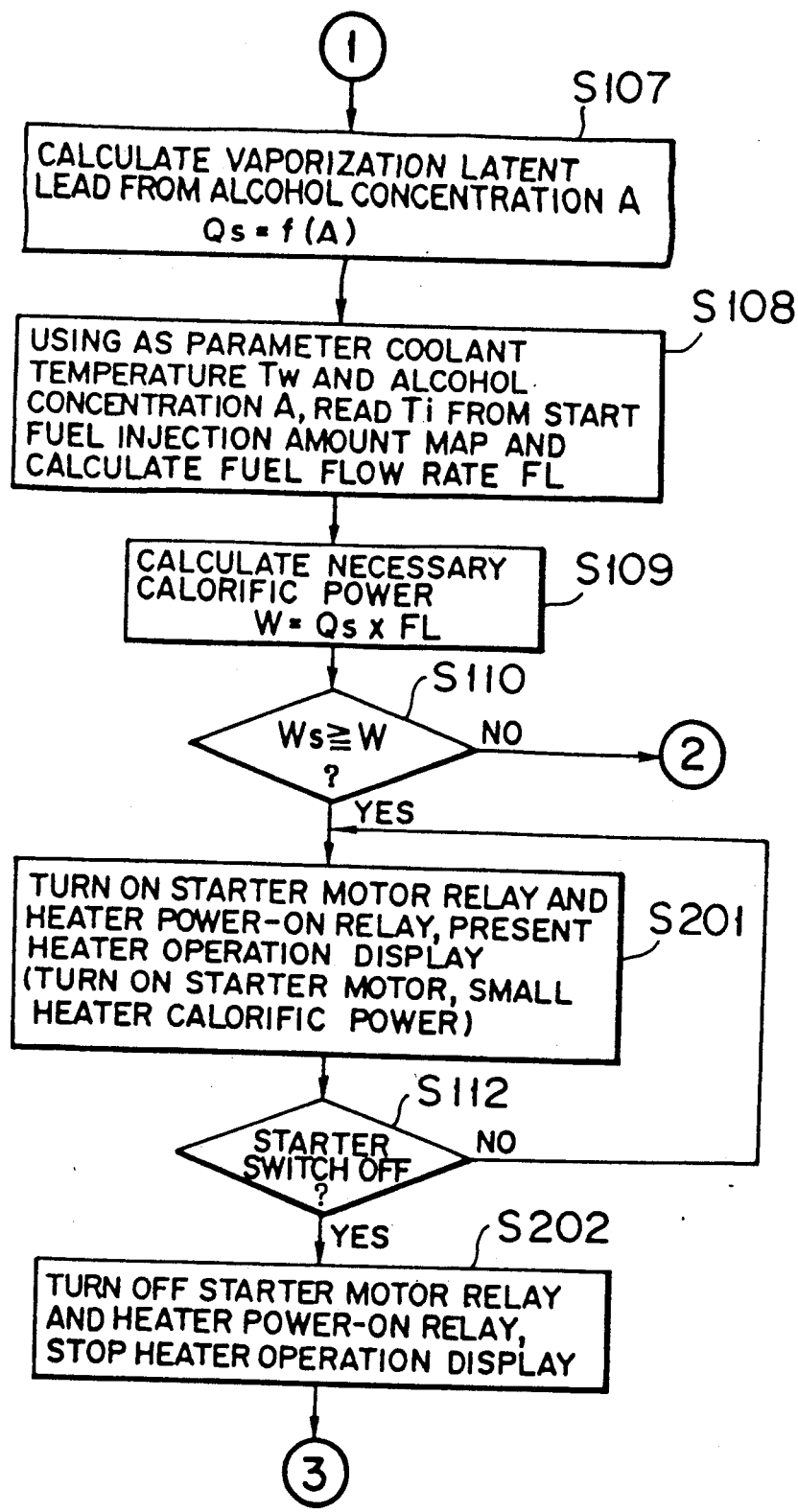
Figure 8C:
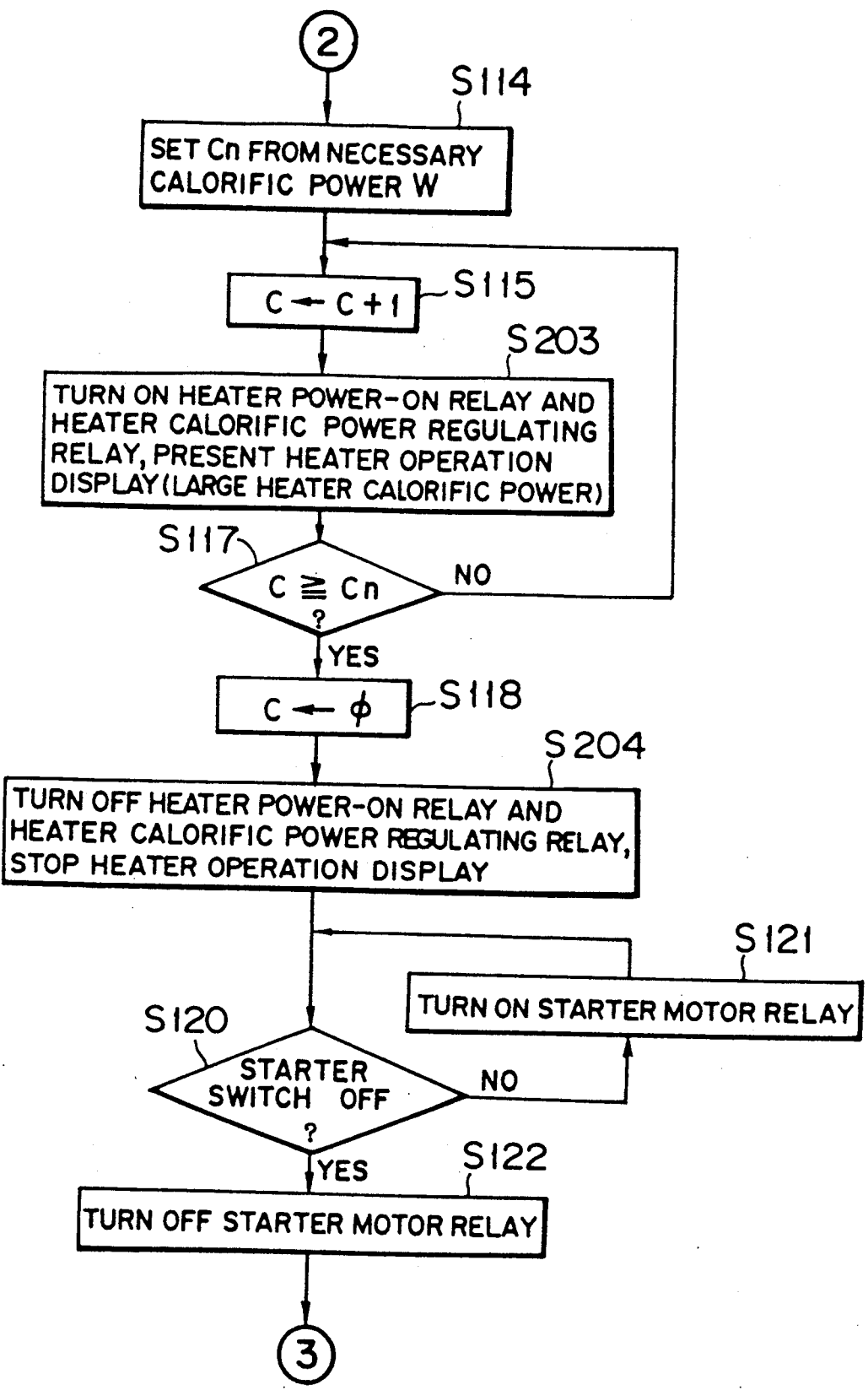

FIGS. 6 to 8 shows the second embodiment according to the first aspect of this invention.

The same elements and means as shown in the first embodiment are represented by the same reference numerals, so that the description therefor is omitted.

Structure of Engine Control System and Control Unit

As shown in FIG. 7, heating means including a heater 20 is mounted under the air chamber 4 of the intake manifold 3. This heater 20 is connected to the battery 39 via a relay contact 48a of a heater relay 48 and via a regulator 50 comprising a heater calorific power regulating relay 49 and a resistor R.

The heater relay 48 and the heater calorific power regulating relay 49 are connected to the driving circuit 46 of the control unit 31. A relay contact 48a of the heater relay 48 is connected to the battery 39, and an interconnection of a parallel circuit of the resistor R and the heater calorific power regulating relay 49 is connected to the relay contact 48a of the heater relay 48.

Function and Structure of Control Unit

As shown in FIG. 6, the engine start function of the control unit 31 is constructed of starter switch state judging means 61, alcohol concentration calculating means 52, start judging means 53, a start judging map MPST, vaporization latent heat calculating means 54, a fuel flow rate calculating means 55, a start fuel injection amount map MPFST, necessary calorific power calculating means 56, and start controlling means 62. The start controlling means 62 is constructed of comparing means 62a, operating time setting means 57b, timer means 62b, starter motor driving means 57d, heater driving means 62c and regulator driving means 62d.

When the starter switch 41 is turned on, the starter switch state judging means 61 outputs a trigger signal to the start judging means 53. When the starter switch 41 is turned off, the starter motor driving means 57d makes the starter motor relay 44 turn off and hence the starter motor 45 turn off, and the heater driving means 62c makes the heater relay 48 turn off not to power the heater 20.

The comparing means 57a compares necessary calorific power W calculated by the necessary calorific power calculating means 56 with a reference value WS. If WS≧W, the starter motor driving means 57d makes the starter motor relay 44 turn on to drive the starter motor 45, and the heater driving means 62c makes the heater relay 48 turn on.

In this case, the heater calorific power regulating relay 49 is maintained off so that the heater 20 is powered at a low power level via the route from the relay contact 48a of the heater relay 48 and the resistor R of the heater calorific power regulating means 50. At the same time, a LED 47 is powered to present a heater operation display. If WS<W, a trigger signal is outputted to the operation time setting means 57b.

With timer means 62b, during the operation time t set by the operation time setting means 57b, the heater driving means 62c makes the heater relay 48 turn on, and the regulator driving means 62d makes the heater calorific regulating relay 49 turn on. Accordingly, the heater 20 is directly connected to the battery 39 to make large the calorific power.

Since the power consumption by the heater 20 is large during the operation time, the starter motor relay 44 is turned off not to drive the starter motor 45. After the lapse of the operation time t, the heater relay 48 and the heater calorific power regulating relay 49 are turned off not to power the heater 20. The starter motor driving means 57d makes the starter motor relay 44 turn on to drive the starter motor 45.

Operation

Next, the operation of the second embodiment will be described with reference to the flow chart of FIG. 8, only with respect to steps that differ from the operation of the first embodiment.

After executing the procedure from the step S101 to the S110 in the similar manner as the first embodiment, the necessary calorific power W is compared with the reference value WS at the step S110. If WS≧W, the control advances from the step S110 to a step S201. At the step S201, the starter motor relay 44 and the heater relay 48 are turned on to drive the starter motor 45 and power the heater 20 at a low power level. At the same time, the LED 47 is powered to display that the heater is now powered.

Next, at the step S112 it is judged if the starter switch 41 is made turned off. If not, the control returns to the step S201 to continue to turn on the starter motor relay 44, the heater relay 48 and the LED 47. If the starter switch 41 is made turned off, the control advances from the step S112 to a step S202.

At the step S202, the starter motor relay 44 and the heater relay 48 are turned off, the starter motor 45 and the heater 20 are turned off, and the LED 47 is turned off to stop the heater operation display and terminate the program.

If WS<W at the step S110, the control advances from the step S110 to the step S114. At the step S114, the operation time Cn is determined and set to a counter of the timer means 62b in accordance with the necessary calorific power W calculated at the step S109.

Next, the counter starts counting At the step S115, the count value C of the counter is incremented by 1. At a step S203, the heater relay 48 and the heater calorific power regulating relay 49 are turned on to power the heater 20 at a high power level. In addition, the LED 47 is powered to indicate that the heater is now turned on.

Next, at the step S117, it is judged if the count C reaches the operation time Cn. If C<Cn, the control returns to the step S115 to continue counting. If C≧Cn, i.e., if the count reaches the operation time Cn, the control advances to the step S118.

At the step S118, the count C is cleared (C=0) to advance to a step S204. At the step S204, the heater relay 48 and the heater calorific power regulating relay 49 are turned off, and the LED 47 is turned off to stop the heater operation display. At the step S120, the starter motor 45 is driven in the similar manner as the procedure of the first embodiment and the program is terminated.

The present invention is not limited to the above embodiment. Three or more heaters may be used to control the engine start finely. Furthermore, a heater may be mounted at the upstream near each air intake port 2a of each cylinder at the intake manifold 3 so that an engine of a multi point injection type may also use the system of the present invention. An engine of an electronically controlled carburetor type may also be applied.

As described so far, according to the first aspect of this invention, when start judging means judges that the engine can be started, necessary calorific power calculating means calculates a necessary calorific power of heating means sufficient for enhancing the vaporization of a fuel and enabling the engine start, in accordance with the engine temperature and the alcohol concentration, and if the necessary calorific power is larger than the predetermined reference value, start control means sets the conduction time of the heating means in accordance with the necessary calorific power. Accordingly, if the necessary calorific power of the heating means is large so that much power will be consumed, the conduction time of the heating means can be limited to a minimum to thus reduce the load of the battery, and prevent wasteful energy consumption.

Figure 9B:
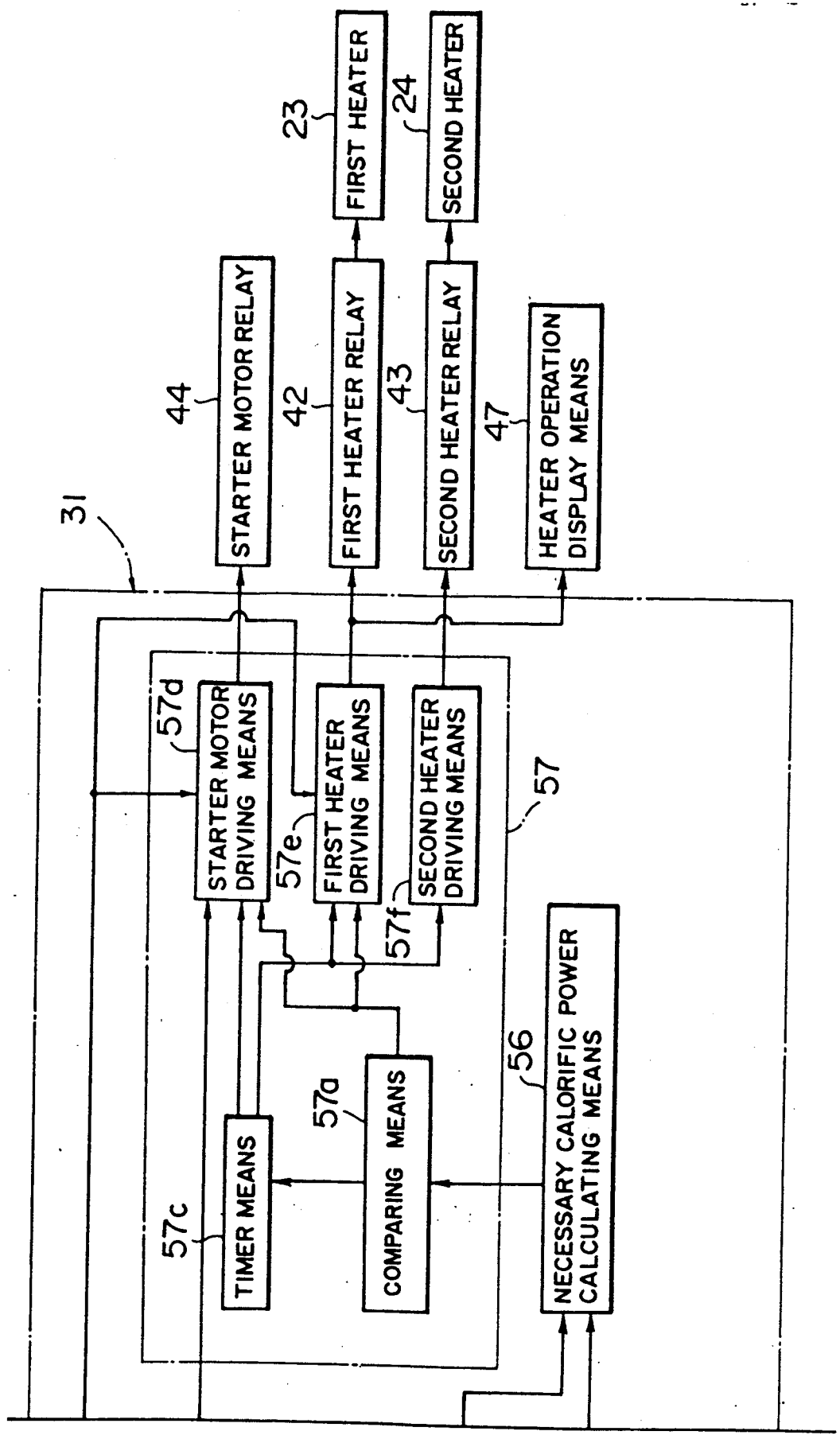
Figure 10B:
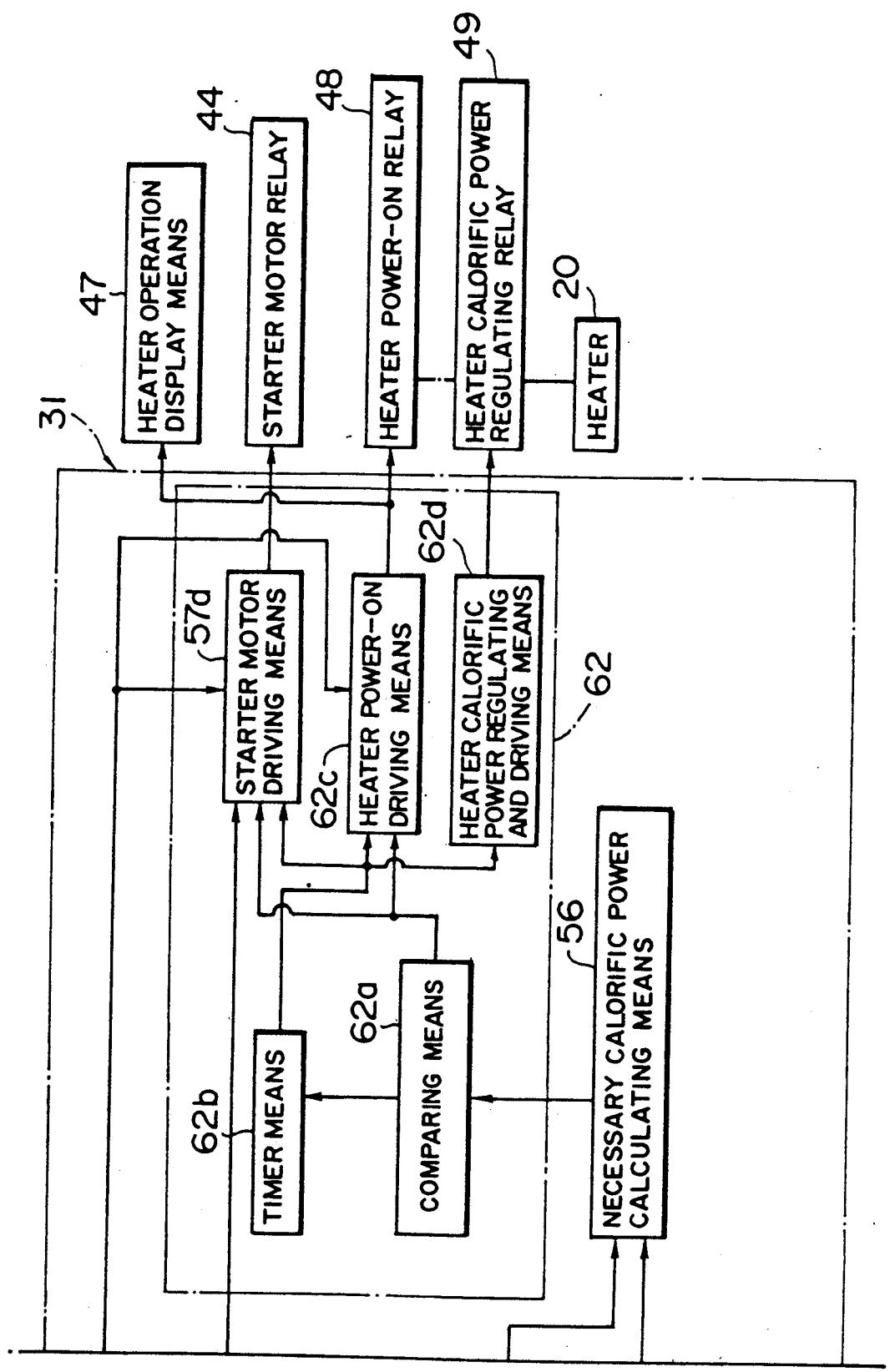

FIGS. 9 and 10 show two embodiments according to the second aspect of this invention, corresponding to the two embodiments (FIGS. 1 and 6) according to the first aspect of this invention.

In the first embodiment shown in FIG. 9, the start control means 57 is constructed of comparing means 57a, timer means 57c, starter motor driving means 57d, first heater driving means 57e, and second heater driving means 57f.

In the first embodiment shown in FIG. 9, the comparing means 57a compares necessary calorific power W calculated by the necessary calorific power calculating means 56 with the reference value WS. If W≦WS, the starter motor driving means 57d makes a starter motor relay 44 turn on, and the first heater driving means 57e makes a first heater relay 42 and a LED 47 turn on to thereby drive a starter motor 45 and a first heater 23 and power the LED 47 to present a heater operation display. If W>WS, the timer means 57c outputs a trigger signal.

Upon receiving the trigger signal from the comparing means 57a, the timer means 57c causes then the first heater driving means 57e and the second heater driving means 57f to make the first and second heater relays 42 and 43 turn on for a predetermined time period (e.g., 3 seconds) so that the first and second heaters 23 and 24 and the LED 47 are turned on. During this time period, the starter motor relay 44 is made turned off not to drive the starter motor 45.

Specifically, through the comparison with the reference value WS, it is judged if the necessary calorific power W can be supplied sufficiently from the first heater 23 only or if the necessary calorific power W should be supplied from both the first and second heaters 23 and 24. If the necessary calorific power W is equal to or smaller than the reference value WS, only the first heater 23 is turned on. In this small power consumption case, the first heater 23 is turned on and the starter motor 45 is turned on to start the engine.

Alternatively, if the necessary calorific power W is larger than the reference value WS, both the first and second heaters 23 and 24 are turned on to supply the necessary calorific power W. In this large power consumption case, the timer means 57c makes the first and second heater relays 42 and 43 turn on for the predetermined time period, and during this period the starter motor 45 is turned off.

FIG. 10 shows the second embodiment according to the second aspect of this invention. This embodiment corresponds to the second embodiment (shown in FIG. 6) according to the first aspect of this invention.

As described so far, according to the second aspect of this invention, when start judging means judges that the engine can be started, necessary calorific power calculating means calculates a necessary calorific power of heating means sufficient for enhancing the vaporization of a fuel and enabling the engine start, in accordance with the engine temperature and the alcohol concentration. Accordingly, the heating means will not consume power wastefully and will prevent energy loss.

Furthermore, start control means compares the necessary calorific power with a predetermined reference value. If the necessary calorific power is larger than the reference value, the heating means is driven for a predetermined period, and thereafter the starter motor is driven. Accordingly, even if the heating means consumes much energy for the necessary calorific power, the engine can be started smoothly without increasing the battery capacity.

Although the present invention has been fully described by way of the preferred embodiments thereof with reference to the accompanying drawings, various exchanges and modifications will be apparent to those of working skill in this technical field. Therefore, unless otherwise these changes and modifications depart from the scope of the present invention, they should be construed as being included therein.

I claim:

1. A start control system for an alcohol engine having heater means for heating fuel injected by an injector, comprising:
   sensing means for sensing an alcohol concentration of the fuel;
   detecting means for detecting an engine temperature;
   judging means responsive to said alcohol concentration and said engine temperature for judging an engine start disable state;
   computing means responsive to said alcohol concentration and said engine temperature for computing a necessary calorific power of the heater sufficient for enhancement of vaporization of the fuel in said engine start disabled state; and
   controlling means responsive to said necessary calorific power for controlling a time for turning on the heater.

2. The system according to claim 1, wherein the engine is provided with a starter for enhancing the start of the engine and a starter switch for producing a starter signal when said starter operates.

3. The system according to claim 2, wherein the computing means comprises vaporization latent heat calculating means responsive to the alcohol concentration for calculating a vaporization latent heat of the fuel, fuel flow rate calculating means responsive to the engine temperature for calculating a fuel flow rate and necessary calorific power calculating means responsive to said vaporization latent heat and said fuel flow rate for calculating the necessary calorific power.

4. The system according to claim 2, wherein the heater means includes a first heater and a second heater.

5. The system according to claim 4, wherein the controlling means comprises comparing means comparing the necessary calorific power with a reference value to determine a small power consumption state when the necessary calorific power is smaller than the reference value and a large power consumption state when the necessary calorific power is larger than the reference value, first heater driving means for turning on the first heater in said small power consumption state and for turning on the first heater for a predetermined time in said large power consumption state, and second heater driving means for turning on the second heater for said predetermined time in said large power consumption state.

6. The system according to claim 5, wherein the controlling means further comprises starter driving means for driving the starter in said small power consumption state in response to the starter signal and for stopping to drive the starter in said large power consumption state in response to said second signal.

7. The system according to claim 5, wherein the controlling means further comprises starter driving means for driving the starter in response to the starter signal in both of said small and large power consumption states.

8. The system according to claim 5, wherein the controlling means further comprises operation time setting means responsive to the necessary calorific power for setting the predetermined time in said large power consumption state.

9. The system according to claim 5, wherein said predetermined time is a constant value.

10. The system according to claim 2, wherein the heater means comprises a heater and a regulator for regulating said heater.

11. The system according to claim 10, wherein the regulator comprises a relay and a resistor parallel to said relay.

12. The system according to claim 10, wherein the controlling means comprises comparing means comparing the necessary calorific power with a reference value to determine a small power consumption state when the necessary calorific power is smaller than the reference value and a large power consumption state when the necessary calorific power is larger than the reference value, heater driving means for turning on the heater in said small power consumption state and for turning on the heater for a predetermined time in said large power consumption state, and regulator changing means for changing the characteristic of the regulator to increase the calorific power of the heater in said large power consumption state.

13. The system according to claim 12, wherein the controlling means further comprises starter driving means for driving the starter in said small power consumption state in response to the starter signal and for stopping to drive the starter in said large power consumption state in response to said second signal.

14. The system according to claim 12, wherein the controlling means further comprises starter driving means for driving the starter in response to the starter signal in both of said small and large power consumption states.

15. The system according to claim 12, wherein the controlling means further comprises operation time setting means responsive to the necessary calorific power for setting the predetermined time in said large power consumption state.

* * * * *